(12) United States Patent
Mestha et al.

(10) Patent No.: US 8,351,100 B2
(45) Date of Patent: Jan. 8, 2013

(54) METHOD TO CREATE SPOT COLORS WITH WHITE AND CMYK TONER AND ACHIEVE COLOR CONSISTENCY

(75) Inventors: Lalit Keshav Mestha, Fairport, NY (US); Grace T. Brewington, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 893 days.

(21) Appl. No.: 12/260,517

(22) Filed: Oct. 29, 2008

(65) Prior Publication Data

US 2009/0296173 A1 Dec. 3, 2009

Related U.S. Application Data

(60) Provisional application No. 61/056,731, filed on May 28, 2008.

(51) Int. Cl.
G03F 3/08 (2006.01)
H04N 1/60 (2006.01)
G06K 9/34 (2006.01)

(52) U.S. Cl. ............................ 358/520; 358/1.9; 382/164

(58) Field of Classification Search .................. 358/1.9, 358/515, 518, 538, 540, 520, 516; 382/162, 382/164, 165, 167; 399/298, 299, 306
See application file for complete search history.

(56) References Cited

U.S. PATENT DOCUMENTS

| | | | |
|---|---|---|---|
| 4,941,038 A | 7/1990 | Walowit | |
| 5,299,291 A | 3/1994 | Ruetz | |
| 5,534,990 A * | 7/1996 | Harris | 399/223 |
| 5,574,666 A | 11/1996 | Ruetz et al. | |
| 5,671,340 A * | 9/1997 | Chapman et al. | 358/1.1 |
| 5,688,626 A * | 11/1997 | Patel et al. | 430/137.14 |
| 5,745,120 A | 4/1998 | De Baer et al. | |
| 5,837,408 A * | 11/1998 | Parker et al. | 430/45.31 |
| 6,066,422 A * | 5/2000 | Blaszak et al. | 430/45.4 |
| 6,575,096 B1 * | 6/2003 | Caruthers et al. | 101/491 |
| 6,867,883 B1 | 3/2005 | Cholewo et al. | |
| 7,032,517 B2 * | 4/2006 | Bestmann | 101/484 |
| 7,054,031 B2 * | 5/2006 | Lee et al. | 358/1.9 |
| 7,402,370 B2 * | 7/2008 | Kmiecik-Lawrynowicz et al. | 430/108.6 |
| 7,499,209 B2 * | 3/2009 | Chopra et al. | 359/296 |
| 7,507,515 B2 * | 3/2009 | Winters | 430/111.4 |
| 7,734,225 B2 * | 6/2010 | Mashtare et al. | 399/223 |
| 7,747,210 B2 * | 6/2010 | DiRubio et al. | 399/401 |
| 2003/0007164 A1 * | 1/2003 | Lee et al. | 358/1.9 |
| 2003/0097947 A1 * | 5/2003 | Caruthers et al. | 101/484 |
| 2004/0023135 A1 * | 2/2004 | Rochford et al. | 430/11 |

(Continued)

OTHER PUBLICATIONS

A.E. Gil, L. K. Mestha, M.F.Hoffmann, "Spot color rendition with Automated Spot Color Editor Technology", Proceedings of 2nd Annual XIG Conference, May 13-15, 2008.

*Primary Examiner* — Madelein A Nguyen
(74) *Attorney, Agent, or Firm* — Fay Sharpe LLP

(57) ABSTRACT

A system and method for achieving process spot color consistency using white and CMYK toners is disclosed. The present application employs traditional CMYK using the automated spot color editing approach and enhances this approach by applying a white toner to the printing substrate prior to applying the color. This new and novel method will improve the color printing technology for printing or alternately, applying the application of the white as a distinct separation layer for the color toner separations, on plastics, ceramics, woods, and other such non-paper materials.

20 Claims, 4 Drawing Sheets

U.S. PATENT DOCUMENTS

| | | |
|---|---|---|
| 2004/0187732 A1* | 9/2004 | Roman et al. ............... 106/31.6 |
| 2005/0215664 A1* | 9/2005 | Elwakil et al. ................ 523/160 |
| 2005/0282928 A1* | 12/2005 | Lin et al. ...................... 523/160 |
| 2006/0082844 A1* | 4/2006 | White ............................ 358/504 |
| 2006/0170938 A1 | 8/2006 | Ibarluzea et al. |
| 2007/0048020 A1* | 3/2007 | Silence ......................... 399/223 |
| 2007/0188535 A1* | 8/2007 | Elwakil et al. ................. 347/15 |
| 2008/0043263 A1 | 2/2008 | Hancock et al. |
| 2009/0153887 A1* | 6/2009 | Lin et al. ........................ 358/1.9 |
| 2009/0185201 A1* | 7/2009 | Lin et al. ........................ 358/1.9 |
| 2009/0296113 A1* | 12/2009 | Mestha et al. ................. 358/1.9 |
| 2009/0296153 A1* | 12/2009 | Wang et al. ................. 358/3.01 |
| 2009/0316165 A1 | 12/2009 | Mestha et al. |

\* cited by examiner

METHOD TO CREATE SPOT COLORS WITH WHITE AND CMYK TONER AND ACHIEVE COLOR CONSISTENCY

This application claims the benefit of U.S. Provisional Application No. 61/056,731, filed May 28, 2008, the disclosure of which is incorporated herein in its entirety by reference.

BACKGROUND

The current art of printing technology is deficient in presenting an effective way to print a wide variety of colors on a plastic, synthetic, or other non-paper surface. Reproduction of a wider variety of colors can be achieved by improving inks to incorporate a white opaque ink layer which serves to achieve a high L* gamut in comparison with a plastic substrate that does not have a sufficiently white layer.

BRIEF DESCRIPTION

The present application extends the process spot color and process color simulation/emulation of spot color gamut. The present application produces color consistency in images containing process spot colors by using white toner as an additional separation and employing color control algorithms. White toner has the ability to make the colors light and to extend the upper part of the spot color gamut in the high L* range. One present embodiment uses white toner in the appropriate xerographic station/housing to apply white first onto the substrate, followed by MYCK. In another embodiment, the process spot color control system will use WMY, WCY, WCMY, WCM gamuts to extend the spot colors in the lighter region of the gamut.

DETAILED DESCRIPTION

Figure 1:
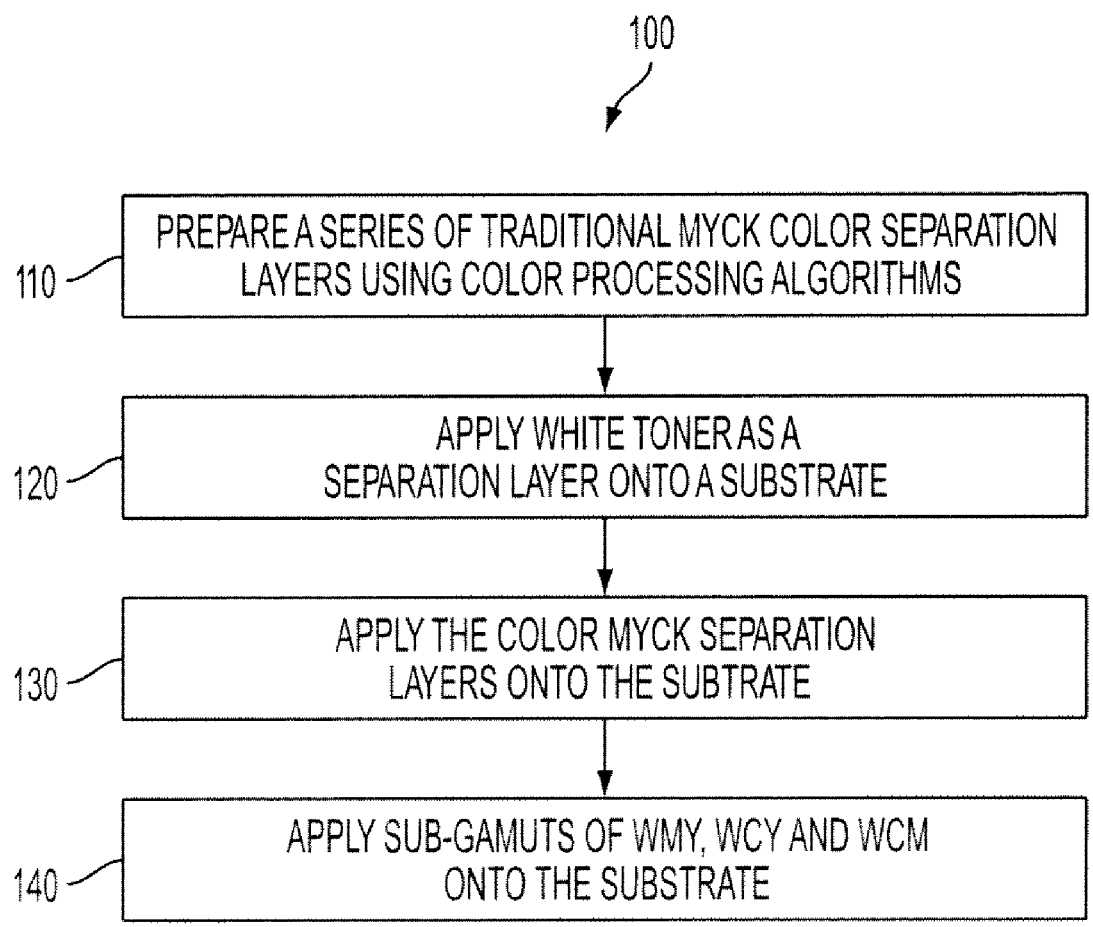
FIG. 1 illustrates a flowchart of the method of creating process spot colors.

FIG. 1, presents a new means for creating process spot colors using a white and using a plurality of toners 100, where the plurality of toners could be, but is not limited to, MYCK, WMYC, WMYCK, or CMKYF. The process begins by preparing at least one color separation layer 110 comprised of the plurality of toners. Then the white toner is applied to a substrate as a separation layer 120. The white layer may be the first layer, but the scope of the present application is not limited to the white layer being the first layer. Finally, the previously prepared color separation layers comprised of a plurality of toners are applied to the substrate 130. An addition step may be undertaken to apply color separation layers of WMY, WCY, WCMY and WCM associated with sub-gamuts onto the substrate 140 in order to bring out the spot colors.

In an alternative embodiment, the separation layers may also be prepared using color processing algorithms. In such an embodiment, a user would prompt a computer operable system by inputting a request for the preparation of the color separation layer and the software would break out the color separation layers in conformity with the user input specifications. A user request and user specifications may be input into the computer operable by use of a user interface such as, but not limited to, a keyboard, touch screen, mouse click, and the like.

The problem is to expand the range of process spot colors, process color simulation/emulation of spot color, printable on plastic, paper, synthetic or other media and achieve color consistency. In current document printing, the spot color gamut for high L* region is limited by the white measurement of the paper or other media. Color consistency is achieved in document printing using process controls and color controls technology. The current art of printing on packaging entails printing on flexible packaging, labels/tags, folding or corrugated cartons, plastics, ceramics, woods, and other such non-paper materials. To enable such printing, a white opaque ink layer is frequently used to achieve the proper color. Color consistency in packaging printing is currently achieved by an operator-controlled mechanical setups, ink control such as concentration, viscosity, mixing, ink key control, and the like.

This embodiment is particularly useful in printing on plastics because the white layer can change the achievable high L* region of the spot color gamut significantly compared with selected plastic substrates without the white layer. For document printing, this invention offers a smaller, incremental spot color gamut increase because the L* region of paper is approximately 95 and will change by only a few units with a white layer.

Two applications for this embodiment are xerographic printing systems for flexible packaging, where 85% of the substrates are plastic, and xerographic systems for printing labels. White toner may be fabricated by conventional means or by an emulsion aggregation process, where the Emulsion Aggregation (EA) is a process of growing 1-15 micron size particles from smaller, nanometer size constituents. The process is environmentally advantaged in that it is water based and does not use organic solvents commonly required to make particles in this size range. The process begins with the preparation of polymer particles in the nanometer size range emulsified in water. These particles and other desired components are then brought together in an aqueous based environment. Through control of the required chemical and physical conditions, the constituent particles are aggregated together to form larger particles. Once the particles reach their target size, the growth mechanism is halted and the particles are heated to achieve the desired shape. Particles can be completely spherical or somewhat irregular in shape. Since the mechanism of particle formation is one of controlled growth, rather than mechanical breakage, there is effective control of the particle size distribution and excellent geometric standard deviations are achieved.

Figure 2:
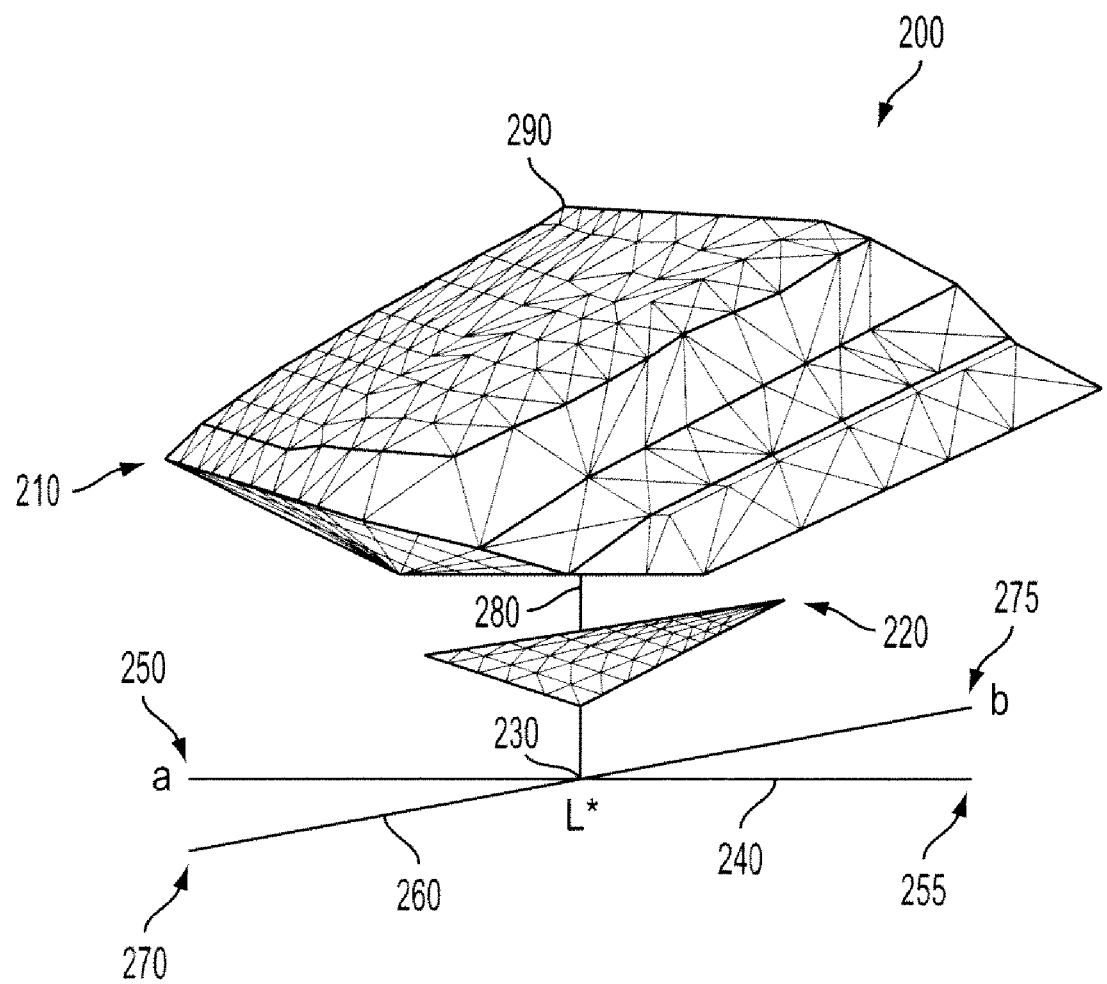
FIG. 2 illustrates a gamut with K values of 0 and 255, with no intervening values.

FIG. 2 demonstrates how a change in the value of black level, represented by K, is inversely related to the volume of the total spot color gamut 200. The CMY gamut 210 is a three-dimensional graphical representation of spot color. A CMY or a CMYK gamut is a representation of the colors that can be printed by a printing technology. The CMYK gamut represents color printing and differs from the RGB gamut that represents colors displayed by a computer terminal. The CMYK gamut comprises a smaller area than the RGB gamut indicating that not all colors displayable on a computer terminal can be displayed by printing means.

The size or volume of the CMYK (i.e., spot color) gamut may be increased by adjusting the black level, also known as K. An increase in K results in a decrease in total spot color gamut volume, while a decrease in the value of K represents an increase in spot color gamut volume 200. The black levels, represented by the value K, changes in variation between a minimum value of K=0 to a maximum value of K=255. The top portion of the gamut 210 volume shown in FIG. 2 has a large volume as signified by the large size of the shape. The bottom portion of the gamut 220 volume shown in FIG. 2 has a much smaller volume as illustrated by an almost flat and colorless gamut. This change in black level is comparable to adding white toner. Generally, colors represented close to the origin 230 of the gamut volume are dark or grayish and weak, while colors represented further away from the origin appear more vivid and strong.

Within the L*a*b* response, the origin 230 represents the intersection of three axis, known as a*, b*, and L*. The a* axis 240 runs horizontally from left 250 to right 255 and represents the green to red values. Here the positive values running from the origin 230 to the right 255 cause a color to become more red in appearance as the value increases. The negative values running from the origin 230 to the left 250 cause a color to become more green in appearance as the negative number decreases moving further away from the origin. Another axis, the b* axis 260 runs back into the page and from left forward 270 to right rearward 275 and represents the blue and yellow values. Here the positive values running from the origin 230 back and right 275 cause a color to become more yellow in appearance as the value increases, while the negative values running from the origin to the front and left 250 cause a color to become more blue in appearance as the negative number decreases in value. The axis values typically run from zero at the origin to 150. Taken together, these two axes represent color saturation and hue. The axis running from top to bottom 280 of the page represents L* which is a measure of the lightness of the color, with the value at the origin 230 zero representing black. As the values increase from zero at the bottom or origin of the graph, the color becomes less black and more white with a numerical value of one hundred representing diffuse white 290 and a value exceeding one hundred representing specular white. This is the upper part of the gamut volume in the high L* range which is extended by the addition of white toner as a separation layer.

Figure 3:
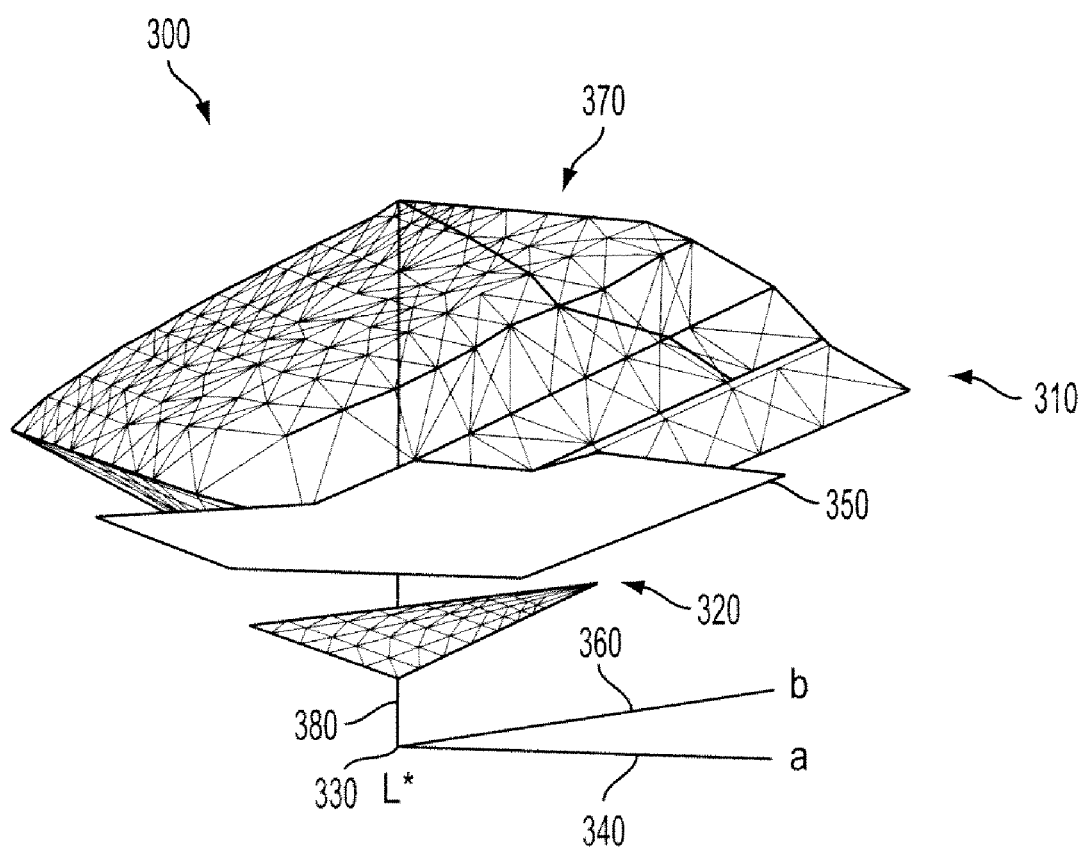
FIG. 3 illustrates a gamut with K values of 0 and 255 with one intervening value of 153.

FIG. 3 also illustrates use of an intermediate gamut 300 in the gamut volume. The large gamut 310 and a small gamut 320 are located on a set of axis that intersects at an origin 330, where the axis are an a* axis 340 running left to right, a b* axis 360, and an L* axis 380. The gamut also increases in volume as k decreases, but also uses an intermediate gamut 350 where k=153 and is located between the large gamut 310 that occurs when k=0 and the bottom gamut 330 that occurs when K=255. Here the intermediate gamut 350 is smaller in size to the large gamut 310, but is larger than the small gamut 320 located toward the bottom of the graph where k=0. The area closest to representing diffuse white is where k=0 at the top of the large gamut 370. These are the upper part of the gamut in the high L* range which are extended by the addition of white toner as a separation layer.

Figure 4:
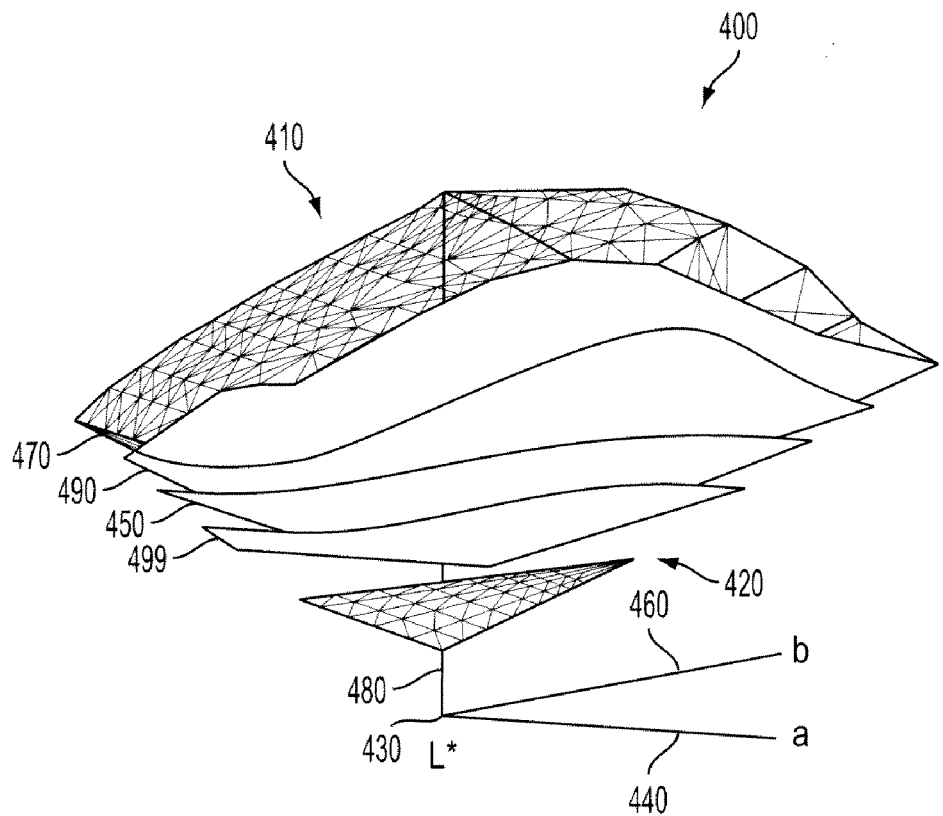
FIG. 4 illustrates a gamut with K values of 0 and 255 with four intervening value of 51, 102, 153, and 204.

FIG. 4 shows more than one gamut located on the same set of axis 400. The size of the gamuts decrease as the value k increases and also when the value of L* decreases. The top gamut 410 that occur when K=0; to the bottom gamut 420 that occurs when k=255 both bracket a series of intermediate gamuts. The common set of axis share a common origin 430. The three axis are the a* axis 440, the b* axis 460 and the L* axis 480. The intermediate gamuts occur when k=51 gamut 470, at K=102 gamut 490; at K=153 gamut 450, and at K=204 gamut 499. This illustrates that the size and volume of a gamut progressively increases as the value of K progressively decreases and as L progressively increases.

Using flood coating of white limits colors presented to a 100% area coverage white under layer. Using white toner in the xerographic station/housing allows for the incorporation of colors represented by additional gamuts in the lighter part of the chromatic colors, using any digitally addressable percent area coverage of white.

Figure 5:
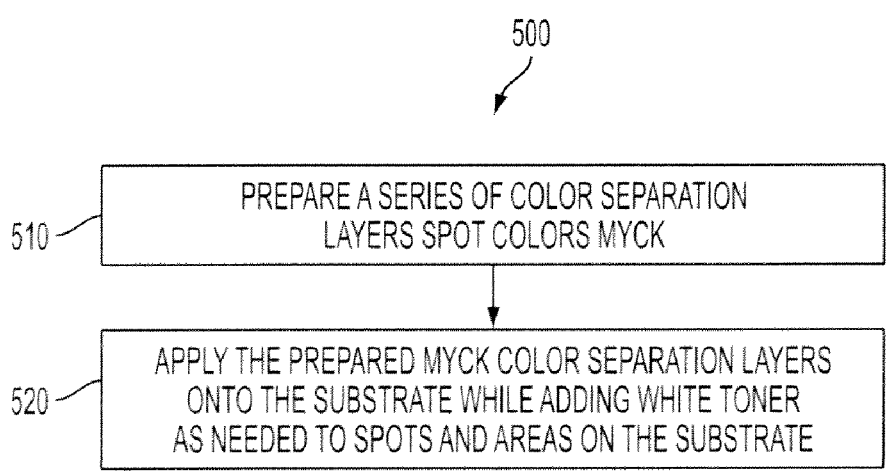
FIG. 5 illustrates a flowchart of the method of creating process spot colors which also incorporates sub-gamuts to enhance spot color.

FIG. 5 illustrates an embodiment method 500 which entails preparing a series of color separation layers 510. The prepared separation layers are then applied to the substrate 520, with the white toner being applied to specific areas and spots on the substrate where the white toner is needed to bring out the spot colors. The colors WMY, WCY, WCMY and WCM represented by sub-gamuts could also be added in a similar manner. The color separation layers and the white toner may be applied in any order such as, but not limited to, color separation layers first, followed by white toner, or the white toner being applied first followed by the color separation layers, or the color separation layers and the white toner may be applied at the same time, at a substantially similar time, or at close to the same time. The color separation layers and the white toner could be applied intermittently, in an order such as but not limited to, applying a portion of the color separation layer, followed by applying a portion of white toner, followed by more color separation layer, followed by more toner, repeating as necessary.

In one embodiment of the current application uses white toner in the appropriate xerographic station/housing such that white toner is applied first onto the substrate. For the purpose of the color controls algorithms, the imaging system will comprise of the use of four stations/housings; WMYC, when white toner is used for process spot colors. When black toner is used normal MYCK approach will be considered.

The differences and advantages between these embodiments and existing technology are:
  The addition of a digitally addressable white toner image.
  The process spot color control system will use additional sub-gamuts representing colors WMY, WCY, WCMY and WCM to extend the spot colors in the lighter region of the spot color gamut.
  Alternatively, depending on the requirement for toner usage, the same basic technology is used for producing spot colors with the full WMYC four color gamut.
  Generally, white paper has absolute L* of around 95. White toner will make the absolute L* higher than 95.
  Hence, all spot color controls using an automated spot color editor approach will be done with respect to absolute L*a*b* targets. Current algorithms use L*a*b* relative to paper.

The present application is not limited to colors using the CMK gamut or the CMKY gamut, and may also incorporate additional colors such as but not limited to the CMYKF gamut used in Hi-Fi color printing devices which may use extra colorants such as red, green, blue, orange, or purple colors.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method performed by a computer operable system for creating process spot colors using white and a plurality of toners, the method comprising:
adjusting a spot color gamut associated with the at least one color toner by extending a measure of lightness L* of a spot color formed by the at least one color toner, the adjusting including:
applying by an imaging station at least one CMYK color separation layer and a white toner layer onto a substrate, the white toner layer being applied to areas on the substrate where white toner is needed for bringing out the spot color formed by the at least one color toner; and
applying by an imaging station at least a second color separation layer associated with a second color represented by a sub-gamut of the spot color gamut onto the substrate, the second color for extending the spot color in a lighter region of the spot color gamut.

2. The method of claim 1 wherein the at least one color separation layer includes one of MYCK, WMYC, WMYCK, and CMKYF.

3. The method of claim 1, wherein the at least one color sub-gamuts is representative of a color selected from a group consisting of: WMY, WCY, WCMY and WCM.

4. The method of claim 1, wherein the applying the at least one color separation layer and the white toner is selected from a group consisting of:
intermittently applying portions of the at least one color separation layer and the white toner;
first applying the at least one color separation layer and second applying the white toner;
first applying the white toner and second applying the at least one color separation layer; and,
substantially simultaneously applying the at least one color separation layer and the white toner.

5. The method of claim 1, wherein the applying the white toner includes applying the white toner to spots or areas of the substrate.

6. The method of claim 1 wherein the applying the white toner includes applying the white toner to spots or areas of at least one color separation layer.

7. The method of claim 1, wherein the white toner separation layers is digitally addressable.

8. The method of claim 1, wherein is the adjusting and the applying are performed by a computer operable color control software embedded in a computer operable medium.

9. The method of claim 1, wherein the substrate may be at least one of flexible packaging, labels/tags, folding cartons and corrugated cartons, plastics, ceramics, woods, and other such non-paper materials.

10. The method of claim 1, wherein the white toner is fabricated by conventional process or by emulsion aggregation processes.

11. A computer operable system for creating process spot colors comprising:
a computer adapted to execute software for preparing at least one color separation layer comprised of at least one color toner prepared using at least one color processing algorithm the computer adapted to:
adjust a spot color gamut associated with the at least one color toner by extending a measure of lightness L* of the at least one color;
computer operable means for receiving a user inputted request for creation of a color separation;
an imaging station adapted to:
apply the at least one CMYK color separation layer and white toner as a digitally addressable separation layer onto a substrate, the white toner being applied to areas on the substrate where the white toner is needed for bringing out the spot color being represented by the at least one color toner, and
apply at least a second color separation layer represented by a sub-gamut onto the substrate for extending the spot color in a lighter region of the spot color gamut.

12. The system of claim 11, wherein the at least one color separation layer and the white toner is applied to the substrate in an order selected from a group consisting of:
intermittently applying portions of the at least one color separation layer and the white toner;
first applying the at least one color separation layer and second applying the white toner;
first applying the white toner and second applying the at least one color separation layer; and,
substantially simultaneously applying the at least one color separation layer and the white toner.

13. The method of claim 11, wherein the white toner may be applied to spots or areas of the at least one color separation layer.

14. The method of claim 11, wherein the white toner may be applied to spots or areas of the substrate.

15. The system of claim 11, wherein the second color represented by the sub-gamut is selected from a group consisting of: WMY, WCY, WCMY and WCM.

16. The system of claim 11, wherein the substrate may be at least one of flexible packaging, labels/tags, folding cartons and corrugated cartons, plastics, ceramics, woods, and other such non-paper materials.

17. An apparatus comprising:
a computer adapted to execute software for adjusting a spot color gamut associated with at least one spot color separation layer by extending a measure of lightness L* of the spot color;
a first color toner applying component included in an image station for applying the at least one spot color separation layer onto a substrate;
a white toner applying component included in an imaging station for applying white toner to the substrate for bringing out the spot color being represented by the at least one color toner; and
a second color toner applying component included in the imaging substation for applying a second color represented by a sub-gamut to the substrate, the second color for extending the spot color in a lighter region of the spot color gamut.

18. The apparatus of claim 17, wherein at least one sub-gamut representing colors formed from WMY, WCY, WCMY and WCM is employed.

19. The apparatus of claim 17, wherein the white toner may be applied to spots or areas of the substrate and to the at least one color separation layer.

20. The apparatus of claim 17, wherein the separation layers and toner may be applied to print on at least one of flexible packaging, labels/tags, folding cartons and corrugated cartons, plastics, ceramics, woods, and other such non-paper materials.

* * * * *